United States Patent
Jennings

(10) Patent No.: US 8,181,931 B2
(45) Date of Patent: May 22, 2012

(54) MECHANICALLY OPERATED HYDRAULIC VALVE ACTUATOR

(75) Inventor: Charles E. Jennings, Tomball, TX (US)

(73) Assignee: Vetco Gray Inc., Houston, TX (US)

( * ) Notice: Subject to any disclaimer, the term of this patent is extended or adjusted under 35 U.S.C. 154(b) by 808 days.

(21) Appl. No.: 12/349,378

(22) Filed: Jan. 6, 2009

(65) Prior Publication Data

US 2010/0171058 A1    Jul. 8, 2010

(51) Int. Cl.
*F16K 31/122* (2006.01)
(52) U.S. Cl. ............................. 251/62; 251/93; 251/94
(58) Field of Classification Search .................. 251/62, 251/63, 63.5, 93, 94, 251
See application file for complete search history.

(56) References Cited

U.S. PATENT DOCUMENTS

| | | | |
|---|---|---|---|
| 4,331,315 A | 5/1982 | Geisow | |
| 4,333,828 A | 6/1982 | Taylor | |
| 4,340,088 A | 7/1982 | Geisow | |
| 4,462,464 A | 7/1984 | Brown | |
| 4,475,710 A * | 10/1984 | Leupers | 251/30.01 |
| 4,527,630 A | 7/1985 | Pringle | |
| RE32,390 E | 4/1987 | Pringle | |
| 4,676,307 A | 6/1987 | Pringle | |
| 5,056,544 A * | 10/1991 | Stevens | 134/166 R |
| 6,298,767 B1 | 10/2001 | Porter | |
| 6,345,668 B1 | 2/2002 | Reilly | |
| 6,481,329 B2 | 11/2002 | Porter | |
| 6,871,618 B2 * | 3/2005 | Masse | 123/90.12 |
| 7,111,675 B2 | 9/2006 | Zisk, Jr. | |

* cited by examiner

*Primary Examiner* — John Rivell
*Assistant Examiner* — R. K. Arundale
(74) *Attorney, Agent, or Firm* — Bracewell & Giuliani LLP

(57) ABSTRACT

A wellhead assembly includes a valve with a valve actuator. The valve actuator linearly moves a valve stem and valve member assembly to selectively open and close the valve. The valve actuator moves the valve stem by reciprocatingly moving a piston that is attached to the valve stem. The piston is moved by applying pressurized hydraulic fluid to a piston surface. Piston direction is controlled by a selector valve that selectively diverts a hydraulic flow to either side of the piston. The actuator further includes a piston assembly for pressurizing a hydraulic flow, where the piston assembly reciprocates in response to engagement by a profiled rotating cam member.

21 Claims, 4 Drawing Sheets

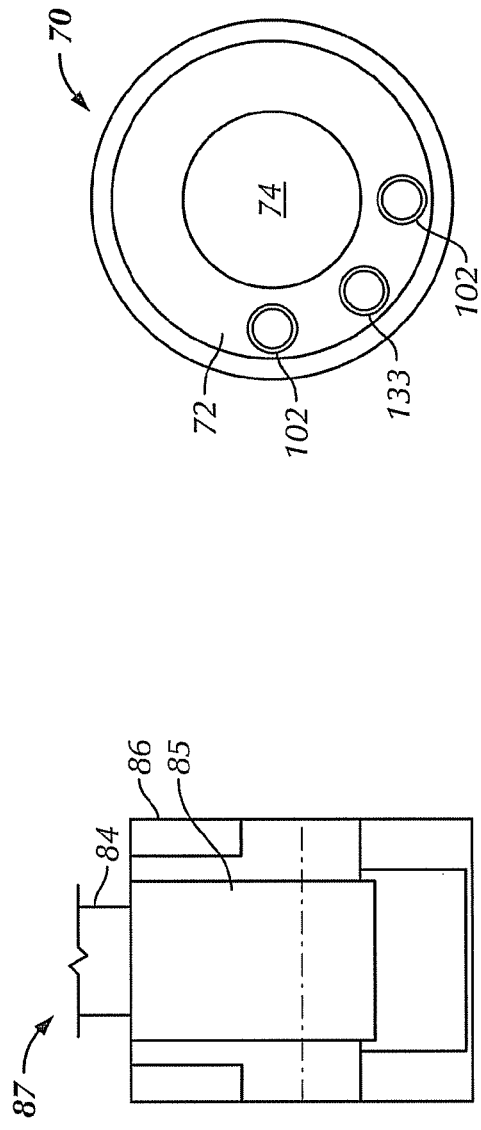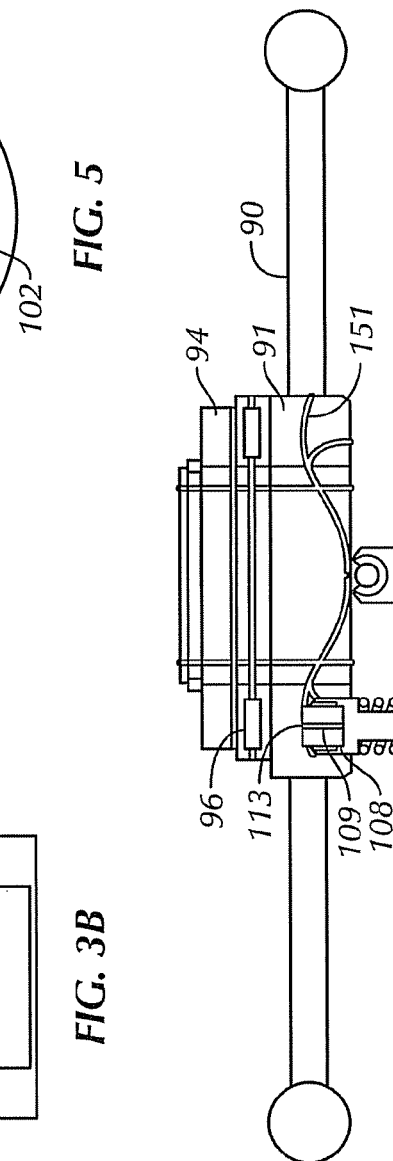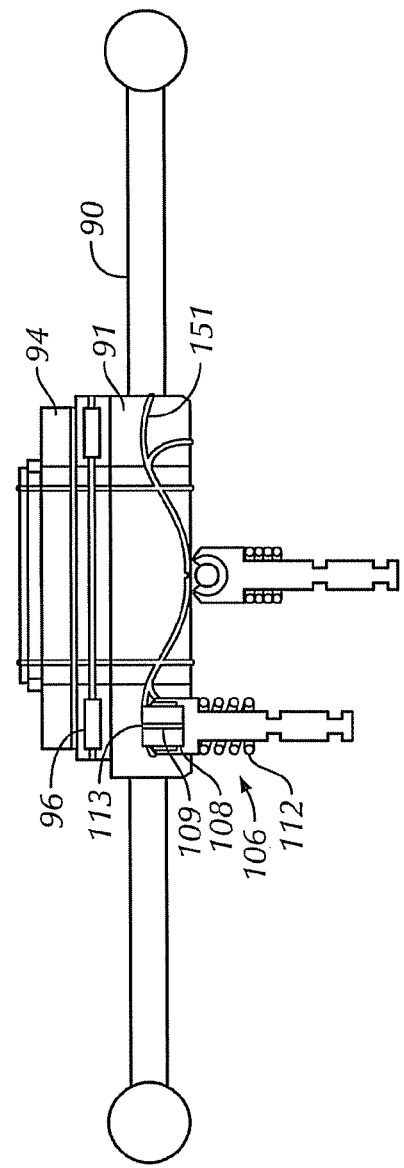
FIG. 3B
FIG. 4
FIG. 5

MECHANICALLY OPERATED HYDRAULIC VALVE ACTUATOR

BACKGROUND

1. Field of Invention

The device described herein relates generally to the production of oil and gas. More specifically, the present disclosure relates to a system and method of mechanically charging hydraulics and actuating a valve using the hydraulics.

2. Description of Related Art

Valves assemblies are typically provided within wellhead production trees of both surface and subsea wellheads. The valve assemblies are used to control the flow of oil or gas from a wellhead and/or for controlling circulating fluid flow in and out of a wellhead. Most valves include a valve body with an inlet and an outlet, a passage connecting the inlet and outlet, a valve member that slides in and out of the passage for controlling flow through the valve, and a valve stem for handling the valve member. A valve handle is generally coupled to the valve stem. Gate valves and other sliding stem-type valves have a valve member or disc and operate by selectively moving the stem to insert/remove the valve member into/from the flow of fluid to stop/allow the flow when desired.

Some larger valves, or valves having a large pressure differential across the valve member, may require an increased actuating force. These valves may require that a gear train may be included between the handle and the stem. Valve assemblies having a gear or gear train coupled with the valve stem may be powered by a rotating source, where the gear train converts the rotating force into a linear force for sliding the valve stem. Opening and closing wellhead valves can be performed manually by rotating a handwheel or handle, or with an actuator. Electrical actuators may include a motor to provide a rotating source whereas a hydraulic actuator typically includes a piston associated with a pressurized hydraulic fluid for actuating a valve.

SUMMARY OF INVENTION

Disclosed herein is a device and method of actuating a valve, the valve may be a part of a wellhead assembly. In one embodiment, a valve actuator for actuating a valve between an open and a closed position includes a housing, a main piston for coupling to the valve and axially movable within a bore of the housing. Moving the piston to a first location in the bore configures the valve in an open position and moving the piston to a second location in the bore configures the valve in a closed position. Also included in this embodiment is a rotatable camplate having a contoured surface and a piston assembly reciprocatable within a cylinder in the housing fillable with fluid. The piston assembly is engagable with the contoured surface, so that rotating the camplate reciprocates the piston assembly within the cylinder. A hydraulic fluid cylinder discharge is provided in the cylinder, so that moving the piston assembly in one direction pushes the fluid into the cylinder discharge. A hydraulic circuit in fluid communication with the cylinder discharge is provided that is in selective communication with the bore on opposing sides of the main piston. Selectively directing hydraulic flow to a side of the main piston moves the main piston between the first and second locations in the bore.

Optionally included is a second piston assembly with a second cylinder, the second piston assembly engagable with the contoured surface. The second cylinder is fillable with fluid and includes a hydraulic fluid cylinder discharge in fluid communication with the hydraulic circuit. A fluid reservoir in fluid communication with a fluid inlet in the cylinder may be included. The assembly may have a selector valve that includes an inlet in fluid communication with the cylinder discharge and an exit in selective fluid communication with one of the bore first location or the bore second location. The selector valve can further include a second inlet selectively in fluid communication with one of the bore first location or the bore second location. The valve actuator can also include a latch coupled between the main piston and the bore wall to selectively retain the piston in one of the positions. In an embodiment, the latch comprises a piston lock housed in a cavity formed on the main piston outer periphery, the piston lock being radially extendable from within the cavity into a recess provided on the bore wall. A lock retainer can be implemented that is moveable from a passage adjacent the cavity into a space between the piston lock and a cavity wall when the piston lock is extended from within the cavity. The valve actuator can further include a seal on the lock retainer in sealing contact with the passage wall, so that the lock retainer is returnable within the passage in response to pressurizing the cavity.

In another embodiment a valve actuator for actuating a valve between an open and a closed position, the valve actuator is described herein that includes a housing having a bore within a longitudinal axis, an axially moveable stem in the bore for coupling to a valve element, an annular main piston in the bore and connected to the stem for axially moving the stem, a rotatable cam plate concentrically mounted around the axis mounted rotatably to the housing, a fluid supply cylinder in the housing offset from the bore, a fluid supply piston having a cam follower in engagement as the camplate rotates with the camplate for stroking the supply piston, and passages leading from the fluid supply cylinder to the bore for delivering hydraulic fluid to the bore to stroke the main piston. The main piston can have a forward side and a rearward side and passages that lead to a bore at opposite ends of the cylinder to stroke the piston in a forward direction and a rearward direction.

Also described herein is a method of actuating a valve. In an embodiment the method includes rotating a crank member having a contoured surface, engaging the rotating contoured surface with a reciprocatable pressurizing element to thereby reciprocatingly drive the reciprocatable pressurizing element, contacting fluid with the reciprocating pressurizing element to form a pressurized hydraulic flow, and actuating the valve by selectively directing the pressurized hydraulic flow to a hydraulic system mechanically coupled to the valve, so that the pressurized hydraulic flow applies an actuating force on the valve through the hydraulic system. Alternatively, the method may include locking and unlocking the piston. Moreover, the actuator can be included on a subsea wellhead and manipulated by a remotely operated vehicle (ROV).

BRIEF DESCRIPTION OF DRAWINGS

Some of the features and benefits of the present invention having been stated, others will become apparent as the description proceeds when taken in conjunction with the accompanying drawings, in which:

FIGS. 3A and 3B respectively are a side partial sectional view of an embodiment of a valve actuator in an open position and an associated valve member in a valve body.

FIG. 4 is a side view of an embodiment of a portion of the valve actuator of FIG. 3.

FIG. 5 is an overhead view of an embodiment of a portion of the valve actuator of FIG. 3.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
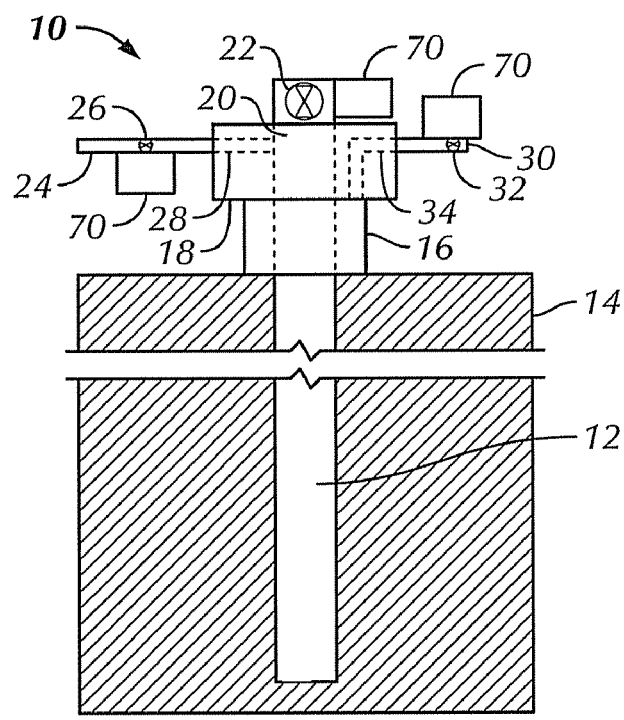
FIG. 1 is a side partial sectional schematical view of a surface wellhead assembly.

FIG. 1 is a side partial sectional view illustrating a wellbore assembly 10 provided over a wellbore 12 that intersects a formation 14. The wellbore assembly 10 includes a wellhead housing 16 mounted in the wellbore 12 and a production tree 18 affixed on the wellhead housing 16. An axial bore 20 is formed through the wellhead assembly 10 allowing passage through the wellhead assembly 10 and into the wellbore 12. A swab valve 22 is provided at the bore 20 upper end. Extending from the production tree 18 is a production line 24 with an inline production valve 26. A passage 28, shown in dashed outline, is provided within the production tree 18. The passage 28 provides communication between the production line 24 and the bore 20.

An optional bypass line 30 also extends from the production tree 18; the bypass line includes an inline bypass valve 32. In the embodiment of FIG. 1, the production line 24 and bypass line 30 extend from opposite sides of the production tree 18. The bypass line 30 registers with a passage 34 within the production tree 18. The passage 34 provides fluid communication from the bypass line 30 to an annulus formed between co-axial tubulars (not shown) disposed within the wellbore 12.

Figure 2:
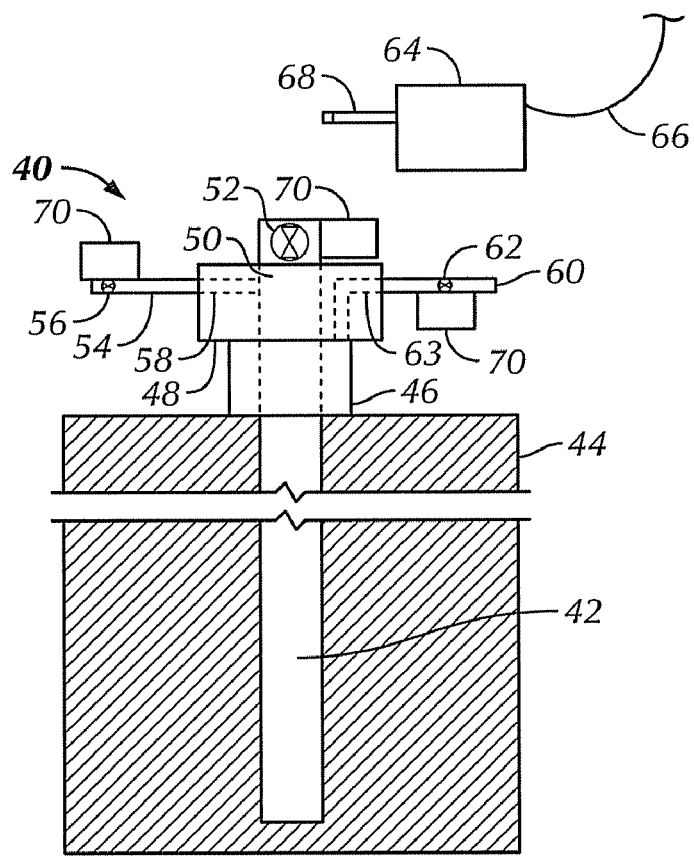
FIG. 2 is a side partial sectional schematical view of a subsea wellhead assembly.

FIG. 2 illustrates a side partial section view of a subsea wellbore assembly 40 for use in producing fluids from a subsea wellbore 42. The wellbore 42 intersects a subsea formation 44. The subsea wellbore assembly 40 includes a wellhead housing 46 with an attached production tree 48. A bore 50 extends through the wellbore assembly 40 providing access through the wellbore assembly 40 to the wellbore 42. A swab valve 52 in the production tree 48 controls flow through the bore 50. A production line 54 having an inline production valve 56 connects to a side of the production tree 48. The production line 54 communicates with a passage 50 that extends through the production tree 48 into communication with the bore 50. A bypass line 60 extends from a side of the production tree 48 opposite the production line 56; the bypass line 60 includes an inline bypass valve 62. A bypass passage 63 within the wellhead assembly 40 registers with the bypass line 60 providing communication between the bypass line 60 and an annulus (not shown) between tubulars in the wellbore 42.

A remotely operated vehicle (ROV) 64 is schematically depicted adjacent the wellhead assembly 40. The ROV 64 is deployed on a tether 66 and includes a control arm 68 projecting outward from the ROV 64. Referring now to FIG. 1 and FIG. 2, a valve actuator 70 is schematically depicted coupled to each valve 22, 26, 32, 52, 56, 62. The valve actuator may couple directly to the valve stem of each valve 22, 26, 32, 52, 56, 62 and apply an actuating force for adjusting flow through the valves 22, 26, 32, 52, 56, 62. The valve actuator described herein can be powered manually or with the ROV 64.

Figure 3A:
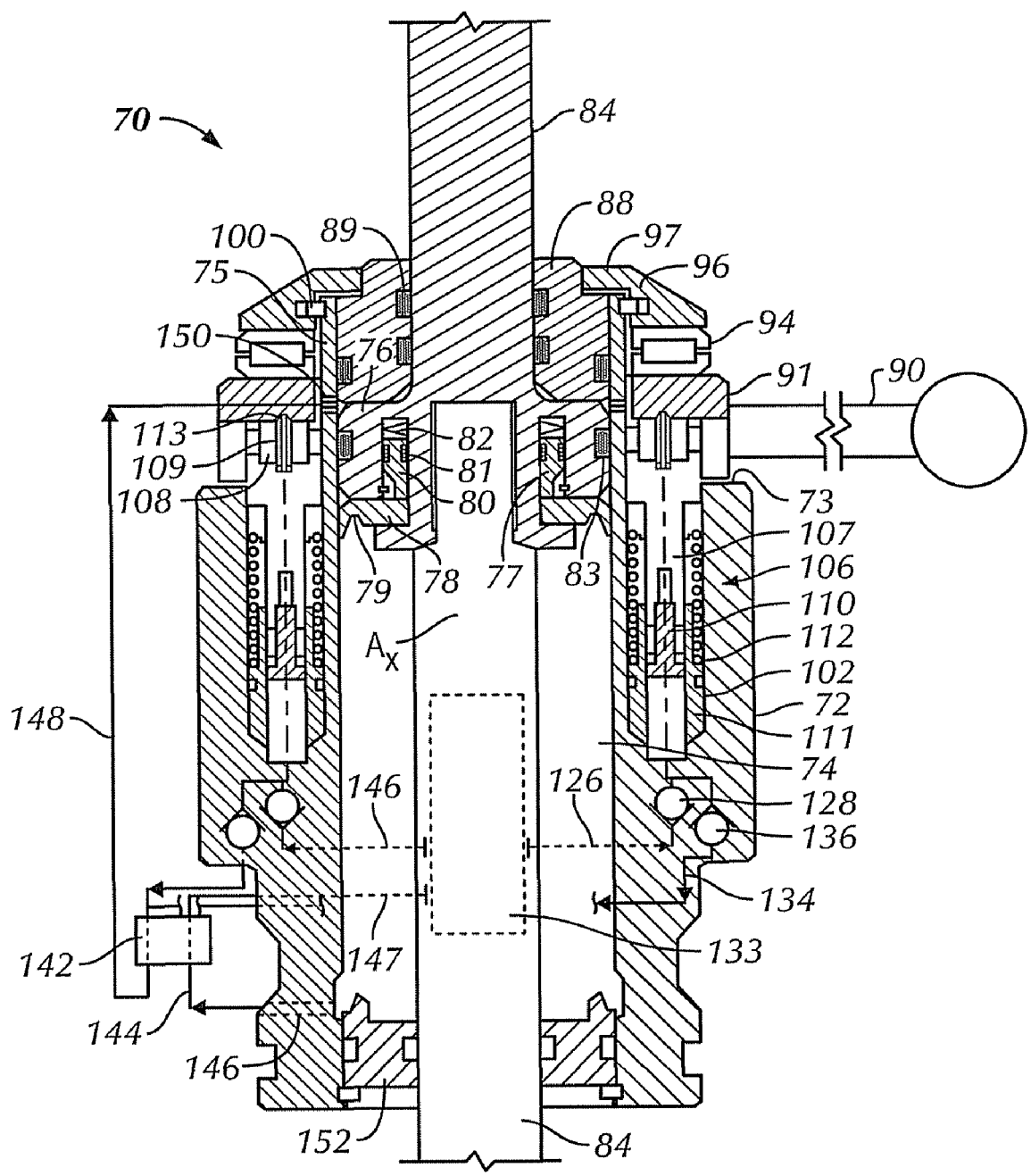

With reference now to FIG. 3A, a side partial sectional view of an embodiment of a valve actuator assembly 70 is provided. In the embodiment of FIG. 3A, the actuator assembly 70 includes a main body 72 having a reduced diameter thereby defining a transition 73. An axial bore 74 is formed through the body 72. The main body 72 includes a reduced diameter neck 75 shown along the bore 74 outer radius from the transition 73 and terminating to define the bore 74 upper terminal end. A main piston 76 is provided within the bore 74 and configured to reciprocate axially within the bore 74. The piston 76 includes a cavity 77 shown formed along the piston 76 outer diameter and directed inward toward the bore axis $A_x$. A piston lock 78 is depicted disposed in the cavity 77. Embodiments of a piston lock 78 include a C-ring pressed within the cavity 77 and biased outward against the bore 74 inner wall. Alternate embodiments include one or more segments provided within the cavity extending along a portion of the piston 76 outer circumference. The piston lock 78 includes a profiled detent 79 (discussed below in greater detail) on a lower surface and adjacent its outer radius. Engaging profiled detent 79 with a correspondingly profiled element draws the piston lock 78 from within the cavity 77 and into a locking engagement within the bore 74.

A lock retainer 80 is shown in cross-section in the vertical portion of the cavity 77. The lock retainer 80 includes a seal 81 on its outer periphery shown in sealing engagement with the cavity 77 wall. A spring 82 shown compressed between an end of the lock retainer 80 in the uppermost portion of the cavity 77. An additional seal 83 is shown on the piston 76 outer periphery in sealing engagement with the bore 74.

The piston 76 is anchored on a stem 84 having an upper end shown projecting upward outside of the housing 72. An upper bonnet 88 is shown provided on the main body 72 upper end. The upper bonnet 88 circumscribes the stem 84 upper end and seals 89 also circumscribe the upper stem in sealing contact to provide a pressure barrier along the stem 84. A gate 85 (FIG. 3B) is coupled to the stem 84 lower end. The gate is provided in a valve body 86, where the valve body 86 includes a valve passage 87. The gate 85 is selectively extendable in and out of the passage 87.

An elongated hand crank 90 is provided and aligned substantially perpendicular with the bore axis $A_x$. The hand crank 90 is attached to a planar camplate 91. The camplate 91 coaxially circumscribes the extended neck 75 outer radius and rests on the main body 72 along the transition 73. A thrust bearing 94, also circumscribing the extended neck 75 outer diameter is disposed on the camplate 91 upper surface.

A top plate 96 on the extended neck 75 upper terminal end is shown secured thereto with a lock ring 100. The lock ring 100 extends into corresponding registered recesses respectively provided on the top plate 96 inner radius in the extended neck 75 outer diameter. The top plate 96 is shown having a generally triangular cross section and includes a flange 97 inwardly depending from its upper portion towards the bore axis $A_x$. The flange 97 is shown engaging a profile on the upper bonnet outer radius, thereby securing the upper bonnet 88 with the main body 72.

A plurality of cylinders 102 are depicted in FIG. 3A shown aligned substantially parallel with and offset from the bore axis $A_x$ projecting into the main body 72. The cylinders' 102 upper ends are open at the transition 73. Piston assemblies 106 are shown disposed within the cylinders 102. The piston assemblies 106 include piston rods 107 that are coupled with rollers 108 on their upper ends. The rollers include ridges 109 circumscribing their outer radii. Further included with the piston assemblies 106 are inner pistons 110 staged within outer pistons 111. Springs 112 radially circumscribe the piston rods 107 spanning lengthwise between shoulders. Shoulders are respectively provided proximate the base of each piston rod 107 and the outer pistons 111. The rollers 108, which are shown contacting the camplate 91 lower surface, have their ridges 109 engaged within a correspondingly shaped V-notch 113 provided on the camplate 91 lower surface.

The cylinders 102 are attached to respective suction lines 126, wherein each suction line 126 includes a check valve 128 that only allows flow in the suction lines 126 in a direction towards the cylinders 102. The suction lines 126 each have an inlet connected with a fluid reservoir 133 (shown in dashed outline). Also attached to the cylinders 102 are discharge lines 134, each discharge line having a discharge check valve 136 limiting flow through the discharge lines 134 in a direction away from the cylinders 102 to a selector valve 142. A lower flow line 144 attaches to a second inlet into the selector valve 142. The lower flow of the line 144 has an inlet connected to a port 146, where the port 146 extends through the main body 72 into fluid communication with the bore 74. Exiting the selector valve 142 is a return line 147 shown in partial dashed outline and terminating at the reservoir 133. A second outlet from the selector valve 142 connects to an upper flow line 148 shown terminating at a port 150. The port 150 is formed through the extended neck 75 and into the bore 74 above the piston 76. A lower port 146 is formed through the body 72 and communicates with a lower portion within the bore 74.

Interaction between the camplate 91 and the piston assemblies 106 is illustrated in a side partially exploded view in FIG. 4. Provided on the lower surface of the camplate 91 is a camring 151. The camring 151 is shown with an undulating contoured profile formed along a substantially circular path on the camplate 91 lower surface. In the embodiment of FIG. 4, the piston assemblies 106 ride the camplate 91 along the camring 151 circular path. The corresponding ridges 109 and V-notch 113 maintain a desired alignment between the piston assemblies 106 and the camplate 91. In one mode of operation, the camplate 91 is rotated about its axis, for example, by applying a lateral force to the hand crank 90. The springs 112 provide a contacting force on the piston assemblies to maintain the rollers 108 in contact with the camring 151 undulating surface. Accordingly, rotating the camplate 91 while maintaining contact between the camring 151 and piston assemblies 106 causes the pistons to track the camring 151 surface moving the piston assemblies 106 in a reciprocating motion.

With reference again to FIG. 3A, reciprocating the piston assemblies 106 within their respective cylinders 102 reduces pressure therein when they stroke upward. The reduced pressure in the cylinders 102 draws fluid from the reservoir 133 through the suction lines 126, across the check valves 128, and into the cylinders 102. Continued camplate 91 rotation engages the piston assemblies 106 with a downwardly depending section of the camring 151 causing one of the piston assemblies 106 to a downward stroke. On the downward stroke, fluid in the cylinders 102 is blocked from flowing into the suction lines 126 by the check valves 128. Instead, the discharge flow from the cylinders 102 is directed to the discharge lines 134, across the check valves 136, and to the selector valve 142. In the embodiment of FIG. 3A, the selector valve 142 directs the discharge flow from the cylinders 102 into the upper flow line 148, which is connected on its other end to the port 150, thereby directing flow into a portion of the bore 74 above the piston 76. Continued pumping, by virtue of rotating the camplate 91 to operate its profiled surface on the piston assemblies 106, continues additional hydraulic fluid flow into the portion of the bore 74 to move the piston 76 and therefore actuate a valve member 85 shown (in FIG. 3B) connected with the valve actuator 70. As noted above, in the embodiment of FIG. 3B, the valve member 85 is in the open position within the valve body 86, allowing flow through the passage 87. Continued operation of the valve actuator 70 ultimately moves the valve member 85 into the passage 87, thereby blocking flow through the valve.

FIG. 5 illustrates in overhead view a partially exploded portion of the valve actuator 70. Here, a cross-section of the valve body is illustrated from above, depicting the spatial relationship between the bore 74, cylinders 102 and the reservoir 133. Accordingly, in this embodiment, the cylinders 102 and reservoir 133 are formed in the main body portion residing below the transition 73.

Figure 6:
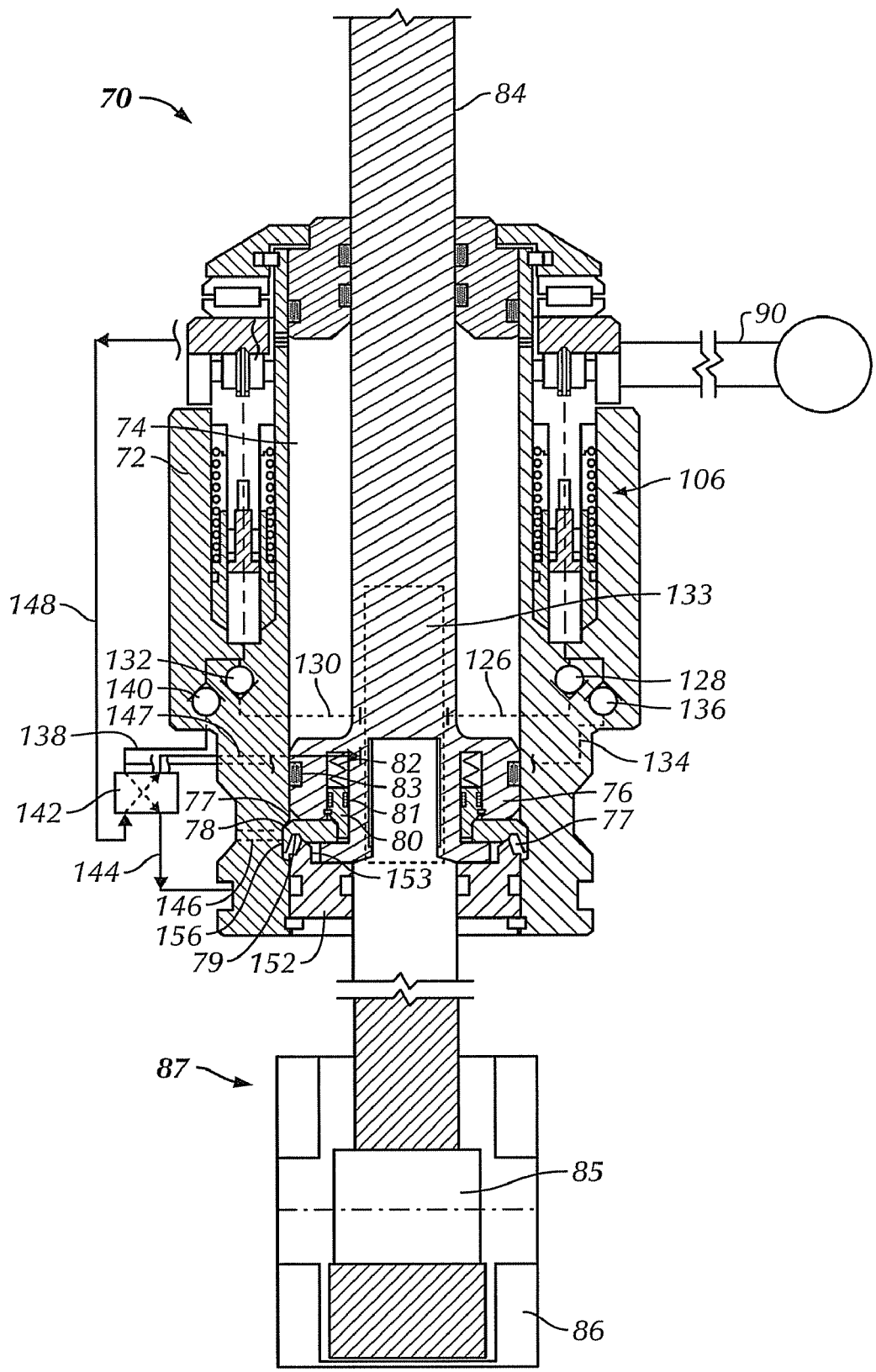
FIG. 6 is a side partial sectional view of an embodiment of the valve actuator of FIG. 3 in a closed position.

With reference now to FIG. 6, a side partial sectional view of the valve actuator 70 is illustrated wherein the associated valve member 85 has been moved within the valve body 86 into a closed position to block flow through the passage 87. Actuating the valve member 85 into the closed position is shown as being accomplished by moving the piston 76 to a lower portion of the bore 74. Optionally, when in the closed position, the piston may be locked in a closed position within the bore 74. The piston lock 78 as shown in FIG. 6 projects outward from the cavity 77. A latch release 152 is shown mounted in the lower portion of the bore 74, the latch release 152 is configured to launch the piston lock 78 from within the cavity 77. The latch release 152 includes an annular peak 153 or ridge formed on the latch release 152 upper surface. The peak 153 is adapted for engagement with the profiled detent 79 on the piston lock 78 lower surface to launch the piston lock 78 from within the cavity 77. Downward piston 76 movement to the bore 74 bottom contacts the detent 79 with the peak 153. Opposingly formed angled surfaces on the peak 153 and the profiled detent 79 come into contact, resulting in a force on the piston lock 78 directed radially outward from the bore axis Ax. The bore wall 74 includes a recess 156 along its lower edge configured to receive the piston lock 78 therein. In embodiments where the piston lock 78 is a C-ring, inherent stress in the ring expands the ring outward so the profiled detent 79 is past the ridge 153. Pushing the piston lock 78 radially outward from within the cavity 77 provides a space in the cavity 77 behind the piston lock 78. The spring 82 can then push the lock retainer 80 into the space thereby securing the piston lock 78 into a locking configuration. Once engaged, the piston lock 78 can secure the piston 76 therein, even though no fluid is in the cylinder 74 to push the piston 76 downward.

In the embodiment of FIG. 6, the selector valve 142 has been manipulated to provide a flow path therethrough as indicated by its internal arrows to open the valve passage 87. Thus, resetting the selector valve 142 as shown in FIG. 6, in combination with providing fluid flow through the selector valve as shown, releases the piston lock 78 and moves the piston 76 upwards within the bore 74. Upward piston 76 movement pulls the valve member 85 into its open position allowing flow through the passage 87. In the embodiment shown in FIG. 6, hydraulic fluid from the reservoir 133 is again drawn into the cylinders 102 by actuating the piston assemblies 106, such as by rotating the camplate 91. Fluid discharged from the cylinders 102 is directed to the selector valve 142 via the discharge lines 134. In the selector valve 142 configuration of FIG. 6, however, the discharge fluid from the piston assemblies 106 through the selector valve 142 is directed to the lower flow line 144; instead of the upper flow line 148 as shown in the embodiment of FIG. 3A. The fluid in the lower flow line 144 from the selector valve 142 is forced through the port 146 and into the bore 74 lower portion. The fluid circulating into the bore 74 lower portion flows into and pressurizes the cavity 77. The seals 81 create a pressure barrier so an upward force is applied to the lock retainer 80 by the pressurized circulating fluid. The applied upward force urges the lock retainer 80 upward into the cavity 77 thereby leaving the space behind the piston lock 78. The fluid pressure builds below the piston 76 seal 83 to push the piston 76 upward. Upward piston 76 movement engages the piston lock 78 with the recess 156 upper surface. Continued pressurized fluid flow into the bore 74 increases the upward force applied to the piston 76 and ultimately exceeds the force to press the piston lock 78 into the cavity 77. The piston 76 is released when the piston lock 78 is pushed into the cavity 77 to allow the piston 76 to travel within the bore 74. Accordingly, as long as a fluid pressurizing source is applied to the hydraulic circuit depicted herein, manipulating the selector switch 142 can dictate the direction of the piston 76 travel within the bore 74 and actuate motion of the valve member 85 in and out of the flow passage 87.

Referring back to FIG. 3A, shown illustrated is an optional embodiment of the piston assemblies 106; this includes a staged piston having the inner piston 110 and corresponding respective outer pistons 111. The inner pistons 110 directly connect to the piston rods 107. The outer pistons 111 circumscribe the inner pistons' 110 outer diameter and under an applied force will disengage from the inner pistons 110. Once disengaged, the outer pistons 111 will slide on the inner pistons' 110 outer surface. Thus, in situations when a valve member 85 may require an excessive force for movement, the valve movement force is transferred into the hydraulic fluid being pumped by the piston assemblies 106. When the force on the piston assemblies 106 transferred from the cylinders' 102 fluid pressure exceeds the threshold sliding force, the inner pistons 110 will begin sliding with respect to the outer pistons 111. Sliding the outer pistons 111 and only moving the inner pistons 110 reduces the piston assemblies' 106 effective cross-sectional area. This area reduction correspondingly reduces the input force necessary to reciprocate the piston assemblies 106 within the cylinders 102. As the force necessary to motivate the valve member is reduced, the inner and outer pistons will become re-engaged, thereby returning the effective piston assembly 106 area to its original area.

Although the valve actuator 70 is illustrated as having a pair of piston assemblies 106, single piston valve actuator embodiments exist, as well as more than two piston assemblies. Further optionally, the valve actuator can be used with any slideable valve, it is not limited to applications of valves operating in conjunction with a wellhead assembly. Optionally, a shaft or other coupling can be affixed to the camplate 91. The camplate 91 can thus optionally be rotated by a motor (or ROV 64) via the shaft or coupling.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

What is claimed is:

1. A valve actuator for actuating a valve between an open and a closed position, the valve actuator comprising:
   a housing:
   a main piston for coupling to the valve and axially movable within a bore of the housing, so that moving the piston to a first location in the bore configures the valve in an open position and moving the piston to a second location in the bore configures the valve in a closed position;
   a rotatable camplate having a contoured surface;
   a piston assembly reciprocatable within a cylinder in the housing fillable with fluid, the piston assembly engagable with the contoured surface, so that rotating the camplate reciprocates the piston assembly within the cylinder;
   a hydraulic fluid cylinder discharge in the cylinder, so that moving the piston assembly in one direction pushes the fluid into the cylinder discharge; and
   a hydraulic circuit in fluid communication with the cylinder discharge and in selective communication with the bore on opposing sides of the main piston, so that selectively directing hydraulic flow to a side of the main piston moves the main piston between the first and second locations in the bore.

2. The valve actuator of claim 1, further comprising a second piston assembly with a second cylinder, the second piston assembly engagable with the contoured surface, the second cylinder fillable with fluid and having a hydraulic fluid cylinder discharge in fluid communication with the hydraulic circuit.

3. The valve actuator of claim 1, further comprising a fluid reservoir in fluid communication with a fluid inlet in the cylinder.

4. The valve actuator of claim 1, further comprising a selector valve having an inlet in fluid communication with the cylinder discharge and an exit in selective fluid communication with one of the bore first location or the bore second location.

5. The valve actuator of claim 4, the selector valve further comprising a second inlet selectively in fluid communication with one of the bore first location or the bore second location.

6. The valve actuator of claim 1, further comprising a latch coupled between the main piston and the bore wall to selectively retain the piston in one of the positions.

7. The valve actuator of claim 6, wherein the latch comprises a piston lock housed in a cavity formed on the main piston outer periphery, the piston lock being radially extendable from within the cavity into a recess provided on the bore wall.

8. The valve actuator of claim 7, further comprising a lock retainer moveable from a passage adjacent the cavity into a space between the piston lock and a cavity wall when the piston lock is extended from within the cavity.

9. The valve actuator of claim 8, further comprising a seal on the lock retainer in sealing contact with the passage wall, so that the lock retainer is returnable within the passage in response to pressurizing the cavity.

10. The valve actuator of claim 1, wherein the contoured surface is undulating.

11. A valve actuator for actuating a valve between an open and a closed position, the valve actuator comprising:
- a housing having a bore within a longitudinal axis;
- an axially moveable stem in the bore for coupling to a valve element;
- an annular main piston in the bore and connected to the stem for axially moving the stem;
- a rotatable cam plate concentrically mounted around the axis mounted rotatably to the housing;
- a fluid supply cylinder in the housing offset from the bore;
- a fluid supply piston having a cam follower in engagement as the camplate rotates with the camplate for stroking the supply piston; and
- passages leading from the fluid supply cylinder to the bore for delivering hydraulic fluid to the bore to stroke the main piston.

12. The valve actuator of claim 11, wherein the main piston has a forward side and a rearward side and passages that lead to a bore at opposite ends of the cylinder to stroke the piston in a forward direction and a rearward direction.

13. The valve actuator of claim 11, further comprising a latch coupled to the main piston to selectively latch the main piston at an end of its stroke into a locked position, allowing hydraulic fluid pressure in the bore to be removed.

14. The valve actuator of claim 12, wherein the latch comprises a piston lock housed in a cavity formed on the main piston outer periphery, the piston lock being radially extendable from within the cavity into a recess provided on the bore wall.

15. The valve actuator of claim 14, further comprising a lock retainer moveable from a passage adjacent the cavity into a space between the piston lock and a cavity wall when the piston lock is extended from within the cavity.

16. A method of actuating a valve comprising:
- rotating a camplate having a contoured surface;
- engaging the rotating contoured surface with a reciprocatable pressurizing element to thereby reciprocatingly drive the reciprocatable pressurizing element;
- contacting fluid with the reciprocating pressurizing element to form a pressurized hydraulic flow; and
- actuating the valve by selectively directing the pressurized hydraulic flow to a hydraulic system mechanically coupled to the valve, so that the pressurized hydraulic flow applies an actuating force on the valve through the hydraulic system.

17. The method of claim 16, further comprising locking the hydraulic system to prevent valve movement while the pressurized hydraulic fluid is not present.

18. The method of claim 16, further comprising unlocking the hydraulic system by rotating the camplate and directing the pressurized fluid flow.

19. The method of claim 16, wherein the step of actuating comprises an action selected from the list consisting of opening the valve and closing the valve.

20. The method of claim 19, wherein the wellhead assembly is subsea, the method further comprising deploying a remotely operated vehicle (ROV) to the wellhead and rotating the camplate with the ROV.

21. The method of claim 16, wherein the step of rotating is in a direction selected from the list consisting of clockwise, counter-clockwise, and both clockwise and counter-clockwise.

* * * * *